TIMING CIRCUIT
Filed Aug. 13, 1962
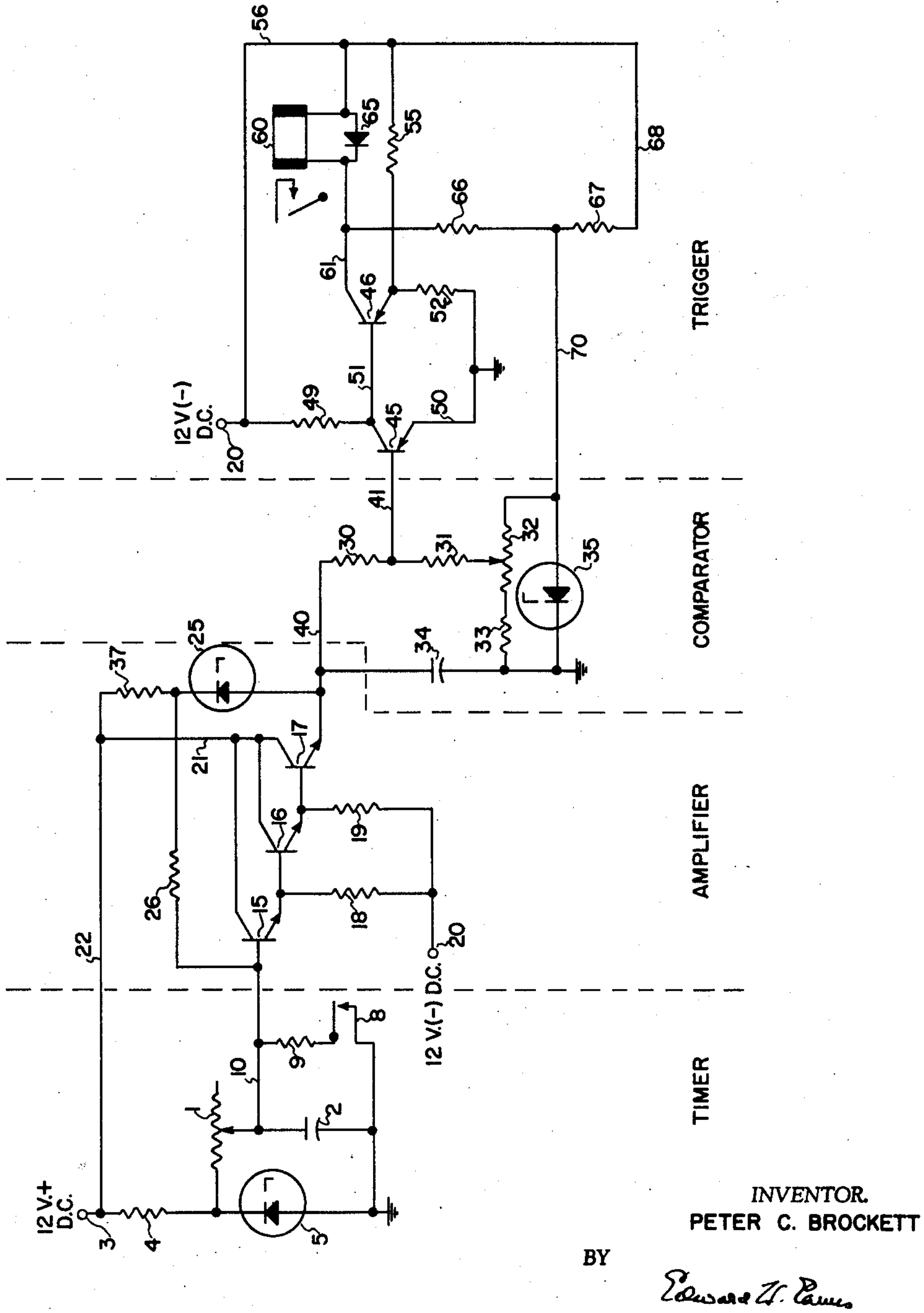
INVENTOR.
PETER C. BROCKETT
BY
Edward W. Rames
ATTORNEY United States Patent Office 3,192,449

Patented June 29, 1965

3,192,449

TIMING CIRCUIT

Peter C. Brockett, Milford, Conn., assignor to Laboratory for Electronics, Inc., Boston, Mass., a corporation of Delaware Filed Aug. 13, 1962, Ser. No. 216,549
9 Claims. (Cl. 317—142)

This invention relates to a timing circuit adapted to be used in conjunction with vehicle traffic controllers or computers. In particular it relates to a timing circuit in which the timing itself is based upon the usual RC timing constant, but in which the circuitry utilizes transistors in lieu of vacuum tubes and yet does not affect the accuracy of the timing.

In the design of traffic control systems, timing circuits are utilized in a variety of ways, both in centralized controllers and in local controllers. Timing circuits are particularly needed for the purpose of timing intervals between traffic light changes. This timing may or may not be varied in accordance with a pre-set pattern, or in accordance with traffic flow actuating tripping mechanisms. Examples of timing circuits usable in traffic control actuation, and for which the present invention may be substituted, are the electronic timing circut disclosed in my prior Patent No. 2,964,625, and, in particular, the disclosure of FIG. 1 thereof; and in Barker Patent No. 2,989,728 in the timing circuit used to actuate the stepping switch shown in FIG. 2 thereof. In the latter patent, the timing is performed by the familiar method of charging a capacitor 74 slowly to the conduction voltage of a gas discharge tube 75 to operate a time interval termination relay 76.

The usual timing device, as exemplified by these patents, is the RC timer with the exponential time constant. It has been found, however, that if one attempts to utilize transistor amplification of RC circuit outputs, the low impedance of the transistor circuitry can, of itself, affect the RC time constant, and consequently destroy its function, or, at best, change its characteristics. It has been found especially difficult to produce a timer circuit adaptable for use in traffic controllers that also operate at low voltage, and utilize relatively small capacitances.

It has been found, however, that these difficulties normally associated with transistorized amplification circuits can be obviated in a timing circuit by using a circuit, as described below, composed of a plurality of transistors arranged in an emitter follower arrangement and coupled with high and constant current feed-back. This high current feed-back utilization enables one to take advantage of the higher input impedance found in a common collector circuit, but at the same time to provide sufficient current flow through these amplifiers as to prevent more than minimal current flow from the timing condenser itself into the amplification circuit.

Accordingly, one of the objects of this invention is to eliminate difficulties normally encountered in the use of transistorized amplifier circuits as supplements to timing circuits by coupling the amplification of the exponential capacitor voltage output through use of emitter follower circuits coupled with sufficient constant current feedback to maintain stability of the amplification stages and to prevent all but minimum current flow from the timing capacitor into the amplification circuit.

Another object of this invention is to provide a transistorized timing circuit for traffic control purposes that will be accurate and yet operate on relatively low voltage power supply.

A further object of this invention is to provide a transistorized timing circuit with the advantage of direct amplification, without the necessity for introducing an alternating current voltage superimposed upon the condenser charging the voltage, and so to obviate the necessity for subsequent totalizing circuits.

A further object of this invention is to provide a voltage comparator circuit for the output of the initial amplification circuits, which comparator circuit includes amplification and feed-back to enable accelerated triggering of a relay or other mechanism associated with the traffic control apparatus.

A still further object of this invention is to design a timing circuit utilizing transistors, and thereby having smaller size, smaller power consumption, less heat output, greater stability, and longer life.

These and other objects of the invention are obtained through the circuit shown in the attached drawing and described below:

The single drawing is a schematic diagram showing the preferred form of circuit arrangement for this invention.

The drawing shows the circuit arrangement necessary for accomplishment of the purposes of this invention. For the sake of clarity, the circuit has been blocked off, showing that it is composed generally of four parts: a timer circuit, an amplifier circuit, a comparator circuit, and a trigger circuit. These four circuits operate together and so accomplish the purposes of the invention.

The timing circuit is made up of the fundamental RC type of timer. The resistance in this instance is variable resistor 1, and the capacitance is 250 microfarad capacitor 2. A twelve volt positive voltage supply 3 is utilized which passes through supply resistor 4 and a constant voltage zener diode 5 to ground. In the particular circuit shown, zener diode 5 provides a constant voltage drop of 10 volts across the resistor 1 and capacitor 2. Resistor 1 is preferably a variable resistor as shown and should have resistance of approximately four thousand ohms per second of desired time delay.

Across capacitor 2 is discharge switch 8 and its associated low value resistor 9. This discharge switch may be traffic actuated, i.e., tripped on the passing of an automobile, or actuated by other timing or computing elements of a traffic control circuit. Switch 8 is normally open and the capacitor 2 discharged only when switch 8 is tripped. The output of the timing circuit will be the normal exponential charging voltage that results from the application of a steady direct current voltage through a resistor to capacitor 2. This output will be on lead 10.

The amplification circuit for the condenser charging voltage consists of a three-stage transistorized amplifier, the transistors being arranged in an emitter follower configuration, that is, a common collector circuit. These transistors are preferably NPN of the TI495 type and are identified as transistors 15, 16, and 17 respectively. Cutoff for transistors 15, 16, and 17 is set by resistors 18 and 19 connected, respectively, between the emitters of transistors 15 and 16 and then to a twelve volt negative power supply 20. The collectors of each of transistors 15, 16, and 17 are connected through leads 21 and 22 to twelve volt positive power supply 3. Since each of the three stages produces a gain of the order of 100 or more, the total amplification will be of the order of one million or more.

Normally a circuit arrangement, as has so far been described above, would draw current from the charging capacitor 2 and, consequently, affect the rate of charge of that capacitor, or even prevent it from charging, thus destroying its utility as a timing condenser. This tendency of the transistor circuit to discharge the timing capacitor increases as the charge on the capacitor increases. This effect is minimized by the use of the current feed-back arrangement represented by zener diode 25 of 1N754A type and resistor 26. Diode 25 is in series with feed-back supply resistor 37 between the amplifier output, i.e., the emitter of transistor 17, and lead 22 connected to power supply 3. Resistor 26 is connected between the amplifier input at lead 10 and the connection between diode 25 and resistor 37.

The output of the third stage of the transistor amplifier, i.e., the output of the emitter of transistor 17, passes to the series load resistors 30 and 31, voltage divider 32, and resistor 33 to ground; minor alternating current fluctuations are filtered off through ten microfarad capacitor 34. Fixed voltage zener diode 35 is across resistor 33 and voltage divider resistor 32 so that the tap on the voltage divider leading to resistor 31 may be set at a fixed maximum voltage.

The load current to load resistors 30 and 31, voltage divider 32, and resistance 33 will increase as the voltage on charging capacitor 2 increases. Therefore, as the capacitor 2 voltage increases, the emitter voltage on transistor 17 will become increasingly positive due to the greater IR drop across the load resistors. The output voltage will vary over a range of about six volts between the discharged and charged condition of timing capacitor 2.

As mentioned above, transistors 15, 16, and 17 represent the three-stage amplifier and are in cascade. Transistors of this type normally have a base to emitter voltage drop of the order of 0.6 volt. Accordingly, the total voltage drop from the base of transistor 15 to the emitter of transistor 17 is about 1.8 volts. This voltage will remain as such and will remain substantially constant regardless of current flow.

Likewise, since it is a zener diode, the voltage across diode 25 will remain a constant 6.8 volts, and so will remain 6.8 volts above the emitter voltage of transistor 17. Since transistors 15, 16, and 17, diode 25 and feedback resistor 26 make up a closed circuit, and since the voltage drop is constant across the three transistors, and likewise, is constant across diode 25, the voltage drop across resistor 26 will remain the same, i.e., 5.0 volts, regardless of the degree of charge on capacitor 2. Therefore, the current through feed-back resistor 26 will remain constant.

Resistor 26 has been so selected as to balance the current flow through the circuit. Preferably, this size will be 6.2 megohms. The above-mentioned constant voltage drop across resistor 26 means that the current through the amplifier circuit resulting therefrom will be constant; and the size resistor selected will result in operation of the three amplification stages at their stable level.

The current drain, which tends to discharge capacitor 2 through the emitter follower circuit, will vary only by an amount to match the variation of voltage of six volts, above-referred to. The load of resistor 30 being at least 6,800 ohms, the variation in output current of the amplifier will be about one milliampere. Since total ampilification is of the order of 1,000,000, current flow from timing capacitor 2 to the base of transistor 15 varies over a range of the order of $\frac{1}{1{,}000{,}000}$ of a milliampere and so is small enough to have only minimal effect upon the timing.

The voltage comparator circuit, previously mentioned, is that made up of resistors 30 and 31, voltage divider 32, resistor 33 and diode 35. The input to this circuit is through lead 40 from the emitter of transistor 17. The output of this circuit is at the mid-point of the resistors 30 and 31 and is on lead 41. This lead goes to the base of the two-stage trigger circuit represented by transistors 45 and 46. These transistors, in contrast to the earlier ones, are of the PNP type. The collector of transistor 45 leads to the twelve volt negative power supply 20 through resistor 49. The emitter is grounded through lead 50. The output of transistor 45 from the collector passes through lead 51 to the base of transistor 46. The emitter of transistor 46 leads to ground through resistor 52, and is also connected through 2,000 ohm resistor 55 and lead 56 to power supply 20. This power supply is also connected through lead 56 to relay 60 and back to the collector of transistor 46 through lead 61. Across relay 60 there may be placed a transient suppression diode 65, if desired.

The collector of transistor 46 is also connected through series resistors 66 and 67, each of 2,000 ohms, through leads 68 and 56 to the power supply 20. The mid-point of resistors 66 and 67 passes through lead 70 through previously-mentioned zener diode 35 to ground. Since resistor 67 is in series with the zener diode 35, the voltage at the midpoint between resistors 66 and 67 will be equal to the voltage drop across diode 35, i.e., minus 6.8 volts, when transistor 46 is not conducting. This arises because, under the circumstances, there is no voltage drop across relay coil 60.

Operation of the circuit of my invention may be considered as starting at the time that switch 8 is closed momentarily by action of a motor vehicle passing a trip, or the actuation of timing or control mechanisms elsewhere in a traffic control unit, and then re-opened. This actuation of switch 8 serves to discharge capacitor 2 through switch 8 and associated resistor 9 and so to re-set the circuit.

Capacitor 2 begins to re-charge when switch 8 is opened. The charging potential is equal to that across diode 5 and the rate of charge is controlled by timing resistor 1; and the charge on capacitor 2 increases in the usual exponential curve.

The voltage across condenser 2 passes through lead 10 to the base of transistor 15 where it is amplified by the increase of the collector-base-emitter current in transistor 15. The potential on the emitter of transistor 15 is then applied to the base of transistor 16 and again amplified; and the output of transistor 16 on its emitter is applied to the base of transistor 17, creating a resulting output current from the emitter of transistor 17 through lead 40 to the load resistance previously described. This current will then vary as the charging voltage on capacitor 2. The greater the voltage on 2, the greater the current through lead 40 and the load resistance.

As stated above, current flow from capacitor 2 through through lead 10 into transistor 15 will, however, be minimal. Since the potential on lead 40 resulting from the voltage drop across the load resistors will increases as the current increases, the absolute voltage on the constant current resistor 26 will likewise increase since diode 25 will remain 6.8 volts greater than the voltage on lead 40. Accordingly, as the potential on charging capacitor 2 increases, the potential on resistor 26 increase, keeping the voltage drop across this resistor the same. Thus the current flow through the three transistors 15, 16, and 17 remains stable, and the collector current does not tend to fall off as the voltage on capacitor 2 increases.

As can be seen, a feed-back current has been provided which is sufficient to maintain the amplifier current stable. Therefore, discharge drain on the timing capacitor is at a minimum.

The voltage drop across transistors 15, 16, 17 totals 1.8 volts. Thus, at the commencement of operation of the circuit with the capacitor 2, grounded, the voltage on lead 40 will be minus 1.8 volts. The voltage across series resistors 33 and voltage divider 32 across diode 35, will also be negative. Therefore, the potential at the midpoint between resistors 30 and 31, i.e., on lead 41, will be negative. The extent to which it is negative depends, of course, upon the adjustment on voltage divider 32

With the lead 41 negative, transistor 45 will be conducting and, accordingly, will ground the base of transistor 46, through lead 51 and 50. With the base of transistor 46 grounded, transistor 46 will be non-conducting and, consequently, relay 60 will remain de-energized.

As the potential drop across timing capacitor 2 becomes more positive, this will cause an increase in the potential on the output of transistor 17 on lead 40. When the potential becomes sufficiently positive, the potential at the mid-point of resistors 30 and 31 and lead 41 will become positive and transistor 45 will cease to conduct. This will permit transistor 46 to conduct and so energize relay 60.

As can be seen, adjustment of voltage divider 32 will determine the extent to which capacitor 2 will have to be charged before the relay 60 is energized.

As previously discussed, the potential at the mid-point between resistors 66 and 67 will be minus 6.8 volts during the period that relay 60 is de-energized. When transistor 46 is conducting, however, and current is flowing through relay 60, this creates a greater voltage drop across the relay 60 and resistor 66 which are parallel with resistor 67. Consequently, the voltage at the mid-point of resistors 66 and 67 will drop from minus 6.8 volts to about minus 6.5 volts. Accordingly, this means that the potential drop on diode 35 is slightly less, i.e., more positive, and the voltage on voltage divider 32 is more positive. This tends to increase the positive voltage slightly on the mid-point between resistors 30 and 31 and lead 41. As a result, the base of transistor 45 is somewhat more positive, and the tendency to cut off transistor 45 is accelerated. Thus, through the feed-back arrangement from the output of transistor 46 to the input of transistor 45, the actuation of relay 60 is accelerated when the potential on lead 40 becomes great enough to provide a cut-off potential on lead 41.

As above described, it can be seen that the relay 60 will be energized a predetermined time after the timing capacitor 2 has been re-set by momentary closing and opening of switch 8. The period of delay before energizing of relay 60 will depend upon the adjustment of timing resistor 1 and the adjustment of the calibrating resistance divider 32. There may, of course, be times in which it may not be desirable to operate the relay 60 immediately upon the timing circuit having run its period. Under such circumstances this timing circuit would be modified so as not to actuate relay 60 until further information has been incorporated into the circuit from other sources. As an example, it might be that relay 60 would be set to change a light switch only after a predetermined period of time as set by capacitor 2 and timing resistor 1, but only then after an automobile tripped the switch showing that traffic had arrived at a red light. Under such circumstances, various methods could be adopted to accomplish this result, such as inserting a normally opened switch in line 61 which would be closed only upon the automobile tripping it. Under these circumstances, when capacitor 2 reached the potential it would indicate passage of sufficient time. This would make transistor 46 conducting, as above described, but such conduction would not trip relay 60 until the added switch in line 61 was tripped.

The resistance of the coil of relay 60 is of the order of 200 ohms or less, in any case, low enough such that the current through the relay via resistor 66 is too small to energize the relay when transistor 61 is non-conducting.

Likewise, switch 8, the re-set switch, would normally be open during timing and may be closed for re-set by the action of a car closing a circuit. There may, however, be other modifications of this desirable, and it may be desired to have the capacitor re-set under conditional and varying circumstances. This would be determined by the total traffic computer circuit desired and adjustment will be within the skill of the art.

A number of circuit values or examples of circuit elements have been mentioned above, but it will be understood that various other circuit values or equivalent circuit elements might be employed within the spirit of the invention.

Reviewing the various circuit components for convenience, the following are given by way of example of one operating circuit without limitation thereto. The voltage at point 3 may be twelve volts positive direct current. Resistor 4 may be 1,000 ohms; the zener diode 5 may be of type 1N758A providing a constant voltage drop of ten volts; adjustable resistor, or timing potentiometer 1, may have a resistance of 4,000 ohms per second of timing desired; timing capacitor 2 may have a capacity of 250 microfarads; and the re-set resistor 9 may have a resistance of 100 ohms.

Transistors 15, 16, and 17 may be of type TI495; resistors 18 and 19 may be 200,000 ohms and 100,000 ohms, respectively; the power supply terminal 20 is minus twelve volts direct current, for example; resistor 37 is 100,000 ohms; zener diode 25 is of type 1N754A having a 6.8 voltage drop; zener diode 35 is of type 1N754A with 6.8 volt drop; capacitor 34 is of ten microfarads; resistors 30 and 31 are of 6,800 ohms; potentiometer 32 is of 2,000 ohms and resistor 33 is 1,000 ohms; transistors 45 and 46 are of type 2N654, for example; resistor 49 is of 10,000 ohms; resistor 52 is of 10 ohms; resistors 55 and 56 and 67 are 2,000 ohms each; relay 60 has a coil of resistance of about 185 ohms, for example; and diode 65 is of type 1N537, for example.

The selection of silicon type NPN transistors for transistors 15, 16, and 17 and PNP germanium-type transistors 45 and 46 provide an automatic compensation against the effect of changes of transistor characteristics with temperature. The silicon transistors have a characteristic such that the voltage at line 40 would tend to rise slightly with increase in temperature, which would tend to shorten the timing. However, with the use of the germanium transistors 45 and 46, having a characteristic of increased base-to-collector leakage current with increasing temperature, the transistor 45 is held conducting to a greater extent with respect to the voltage applied to its base, and this counteracts the effects of the higher voltage on lead 40, previously described, as a result of the temperature increase on the silicon transistors 15, 16, and 17.

While the circuit has been described in its preferred form with the charging of capacitor 2 providing the timing period and the capacitor being re-set by discharge via the contacts of switch 8, it is obvious that this action could be inverted so that the timing occurs during the discharge of capacitor 2 with re-set by restoring the capacitor 2 to the voltage across the zener diode 5, in a manner similar in this respect to the alternate connection shown by my prior Patent No. 2,964,625 referred to. In the present circuit in this alternate form of discharge timing, the lower side of capacitor 2 would be disconnected from the ground and connected to the upper side of zener diode 5, the remainder of the circuit staying the same and the relay being operated at termination of the time period as before.

A further alternate arrangement of the circuit may be made by substituting an equivalent resistance for relay coil 60 in the collector circuit of transistor 46 and transferring relay 60 to substitute for resistor 49 in the collector circuit of transistor 45, in which case the action of the relay would be inverted in that it would remain normally energized during timing and would release at the termination of the time interval. With the latter arrangement, the relay contacts could also be reversed to close upon release of the relay, if desired.

Thus, I have shown the preferred form of my invention and described certain alternative forms thereof. It will be obvious to those skilled in the art that various other changes may be made in the circuit arrangement, or in circuit components, without departing from the spirit of my invention.

I claim:

1. A timing circuit including a timing condenser having a charge varying slowly for timing, an amplifier coupled to said condenser to amplify the voltage thereon, said amplifier including a plurality of high gain transistor stages of the emitter follower configuration, each of said stages having a constant base-emitter potential drop, a constant voltage feed-back from the output of said amplifier to the input thereof, the voltage of said feed-back being greater than the total potential drop across said stages, a feed-back impedance in series with said constant voltage feed-back, said impedance and said feed-back being set at a level to maintain base-emitter current flow stability in said amplifier over the operating range thereof as the charge on said condenser varies in timing, and a trigger circuit actuated by the output of said amplifier to respond to an output level corresponding to a predetermined charge level of said timing condenser.

2. A timing circuit including a resistance-capacitor timing circuit and a re-set circuit coupled thereto, a multistage transistorized emitter follower amplification circuit coupled to the capacitor to receive and to amplify the voltage on said capacitor, said emitter follower circuit having a constant potential drop from the input of the first stage of said multi-stage circuit to the output of said circuit, a constant potential feed-back circuit having potential drop greater than that across said emitter follower circuit and coupled thereto for feeding into said emitter follower circuit a constant current, and means responsive to the output of said emitter follower circuit for providing a triggering output.

3. The circuit of claim 2 in which said last-named means includes a comparator circuit coupled to receive the output voltage from said emitter follower circuit and to compare it with pre-set voltages and to produce an output voltage related thereto, and a transistorized amplifier trigger circuit coupled to receive the output of said comparator circuit and to provide said triggering output in response thereto.

4. A timer circuit including a resistance capacitor timer circuit producing an exponential output voltage related to the charge on said capacitor, a transistorized amplifier circuit coupled to said resistance-capacitor circuit to receive said last-named voltage, said amplifier circuit being an emitter follower circuit of at least two stages, a constant current feed-back circuit coupled with said emitter follower circuit to feed-back a current to the input of said emitter follower circuit sufficient to maintain the base-emitter current stability of said emitter follower circuit while said voltage varied exponentially in timing, whereby the current flow from said capacitor into said emitter follower circuit is minimized, and a trigger circuit actuated by the output of said emitter follower circuit to trigger in response to the last named output when a predetermined charge has been reached on said timer capacitor.

5. A timer circuit as claimed in claim 4, in which said trigger circuit has a feed-back circuit to the output of said emitter follower circuit whereby triggering of said trigger circuit is accelerated.

6. A timer circuit as in claim 4, in which the amplifier circuit includes silicon transistors and in which said trigger circuit includes germanium type transistors.

7. A transistorized amplifier circuit to receive the output from a timer circuit, said output being the voltage across a timing capacitor, said amplifier circuit including a plurality of NPN transistors arranged in an emitter follower amplifier configuration of multiple stages, feedback means coupled with the output of said amplifier for feeding back current into the input of said amplifier circuit, said feedback means including a zener diode having a voltage drop greater than the total voltage drop between the input of said amplifier and the output thereof, said diode leading from the said output to the power supply used by said amplifier, and a resistor and leading from said diode to the input of said amplifier circuit whereby a stabilizing current flow is caused to flow from said power supply to said input irrespective of the charge on said timing capacitor.

8. A timing circuit including a condenser, means for varying the charge on said condenser progressively from an initial value to a different final value for timing, an amplifier coupled with said condenser to amplify the voltage thereon, said amplifier including a plurality of high gain transistor stages of the emitter follower configuration, each of said stages having a constant base-emitter potential drop, a constant voltage feed-back from the output of said amplifier to the input thereof, the voltage of said feed-back being greater than the total potential drop across said stages, a feed-back impedance in series with said constant voltage feed-back, said impedance and said feed-back being set at a level to maintain, base-emitter current flow stability in said amplifier over the operating range thereof as the charge varies on said condenser in timing, and a trigger circuit actuated by the output of said am-amplifier to respond to output level corresponding to a predetermined charge level of said condenser.

9. A timer circuit including a resistance capacitor timer circuit producing an exponential output voltage related to the charge on said capacitor, a transistorized amplifier circuit coupled to said capacitor to receive said last-named voltage, said amplifier circuit being an emitter follower circuit of at least two stages, a current feed-back circuit coupled to said emitter follower circuit to feed-back a current to the input of said emitter follower circuit sufficient to maintain the base-emitter current stability of said circuit while said voltage varies exponentially in timing, whereby current flow from said capacitor into said emitter follower circuit is minimized, a trigger circuit coupled to the output of said emitter follower circuit to be actuated thereby when a predetermined charge has been reached on said timer capacitor, and a relay coupled to said trigger circuit to be controlled by such actuation.

References Cited by the Examiner

UNITED STATES PATENTS

| | | | |
|---|---|---|---|
| 2,874,236 | 2/59 | Sikorra | 330—24 X |
| 2,949,545 | 8/60 | White | 307—88.5 |
| 3,018,420 | 1/62 | Norris | 317—148.5 |
| 3,049,627 | 8/62 | Higginbotham | 307—88.5 |
| 3,106,684 | 10/63 | Luik | 330—9 X |

SAMUEL BERNSTEIN, *Primary Examiner.*